United States Patent
Pogde et al.

(10) Patent No.: US 10,223,544 B1
(45) Date of Patent: Mar. 5, 2019

(54) CONTENT AWARE HIERARCHICAL ENCRYPTION FOR SECURE STORAGE SYSTEMS

(71) Applicant: EMC Corporation, Hopkinton, MA (US)

(72) Inventors: Prashant Pogde, Sunnyvale, CA (US); Fabiano C. Botelho, Sunnyvale, CA (US); Nitin Garg, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 228 days.

(21) Appl. No.: 15/222,435

(22) Filed: Jul. 28, 2016

Related U.S. Application Data (63) Continuation of application No. 14/229,364, filed on Mar. 28, 2014, now Pat. No. 9,432,192.

(51) Int. Cl.
*G06F 21/62* (2013.01)
(52) U.S. Cl.
CPC .................. *G06F 21/6227* (2013.01)
(58) Field of Classification Search
CPC .................................................. G06F 21/6227
See application file for complete search history.

(56) References Cited

U.S. PATENT DOCUMENTS

| 6,751,622 | B1 | 6/2004 | Puri et al. |
| 7,836,313 | B2 * | 11/2010 | Ellard ............... G06F 17/30117 380/277 |
| 8,954,399 | B1 | 2/2015 | Balakrishnan |
| 9,171,042 | B1 | 10/2015 | Welton et al. |
| 2007/0245410 | A1 * | 10/2007 | Perlman ............... H04L 9/0836 726/6 |
| 2011/0099362 | A1 * | 4/2011 | Haga .................... H04L 9/0822 713/2 |
| 2013/0232306 | A1 | 9/2013 | Dhuse |

* cited by examiner

*Primary Examiner* — Esther B. Henderson
(74) *Attorney, Agent, or Firm* — Womble Bond Dickinson (US) LLP (57) ABSTRACT

In one embodiment, in response to a request received from a client for retrieving a data object stored in a storage system, a root key is obtained from the request. The data object is represented by metadata in a hierarchical structure having a plurality of levels. Each level includes a plurality of nodes and each node being one of a root node, a leaf node and an intermediate node. The hierarchical structure of metadata associated with the data object is traversed in a top-down approach to decrypt each of a plurality of nodes in the hierarchical structure using a key provided from its parent node, starting from the root node to the leaf nodes, including decrypting the root node using the root key. Decrypted data associated with the plurality of nodes is transmitted to the client.

21 Claims, 6 Drawing Sheets

CONTENT AWARE HIERARCHICAL ENCRYPTION FOR SECURE STORAGE SYSTEMS

RELATED APPLICATION

This application is a continuation application of U.S. application Ser. No. 14/229,364, filed Mar. 28, 2014. The disclosure of the above application is incorporated by reference in its entirety.

FIELD OF THE INVENTION

Embodiments of the present invention relate generally to data storage systems. More particularly, embodiments of the invention relate to hierarchical encryption for secure storage systems.

BACKGROUND

Currently in order to support data security at rest most secure storage systems use encryption. One of the key features of such a system is the ability to respond to compromised encryption keys. Most known systems implement such a functionality by walking through the storage system namespace, decrypting the contents using the old key and re-encrypting the data with the new key. Such an implementation is slow to respond to the security threat posed by a compromised key because it is a very long running process and takes a long time before the sensitive data is re-encrypted with the new key. If the new key also gets compromised in the middle of re-encryption process, it adds new implementation challenges for the storage system designers.

In a snapshot based system or a de-duplicated system, it is difficult to implement such a feature because same data blocks are shared amongst multiple entities (e.g. multiple files and/or snapshots). The file system has to keep track of all of these multiple keys and how they are mapped to individual data blocks. Implementing such functionality in a system that remains accessible throughout the re-encryption process only adds new challenges. Storage replication adds another dimension to the security of data when the key gets compromised, because the data could reside in multiple locations and possibly encrypted with the same compromised key.

Crypto shredding to do data sanitization has been utilized to prevent shredded data from being recovered and such a process is a slow operation for large storage systems and especially challenging to a deduplicated storage system. Currently, existing data sanitization techniques lack the ability to do instant sanitization. Techniques that do not use crypto shredding are inherently slower. Even crypto shredding requires frequent key rotation to a file system namespace while forgetting (deleting) the older keys. This itself is an expensive operation to decrypt and re-encrypt the entire file system namespace.

For deduplicated storage systems, one of the key problems is efficiently identifying unreferenced data blocks. In deduplicated systems, same data blocks can be shared amongst multiple entities. For the sake of efficiency, some of these systems do not do reference counting of the individual data blocks. This makes it difficult to determine all the data blocks that are still active in the storage system namespace. The problem becomes manifold as the storage system scale goes in a multiple-terabyte range. Storage systems that have snapshot/clone feature such that it can share blocks amongst multiple snapshots also suffer from similar complexities. It is difficult to design a storage system that can sanitize an individual file, directory, snapshot or a clone.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, hierarchical encryption techniques are utilized that solve all of the abovementioned problems and can be used by storage systems including the snapshot based and/or deduplicated storage systems. The encryption scheme allows for auto key rotation towards a root node of the file system hierarchy as the file system is modified, for example, by only modifying an encryption key of the root node. By using hierarchical encryption it is possible to share arbitrary parts of the encrypted file system tree that share the same file system hierarchy. In addition, the properties of content aware hierarchical encryption are utilized to achieve instant crypto shredding. In one embodiment, convergent encryption techniques are applied to the entire storage system hierarchy as an encrypted directed acyclic graph (DAG) in a hierarchical fashion.

A storage system hierarchy can be considered as a tree structure where data blocks get pointed to by the metadata blocks which themselves are pointed to by one or more parent levels of additional metadata block in a tree structure. Eventually a file inode points the root of the entire block-map tree. File inodes in turn reside in a directory data block that itself gets pointed to by the directory metadata blocks and this entire hierarchy can roll up all the way up to the super-block/prime-segment/root of the file system tree. In the hierarchical file system tree of a deduplicated storage system, leaf nodes represent content of deduplicated data chunks or segments stored in the deduplicated storage system. An intermediate node represents metadata describing one or more child nodes as either lower level intermediate nodes and/or the leaf nodes. A root node of the hierarchical tree represents a content handle of a file, a directory of one or more files, and/or the entire file system.

In one embodiment, each of the nodes in the hierarchical tree is encrypted using an encryption key that is generated based on content of the corresponding node (e.g., hashing of the content of the corresponding node). Thus, each of the nodes in a hierarchical tree is encrypted using a different key. The encryption key of a particular node (e.g., child node) is stored together with content of its parent node. The encryption key of the child node and content of the parent node are then encrypted by a parent key, where the parent key is generated based on content of the parent node (e.g., hashing of the content of the parent node), and so on. In this embodiment, the encryption process of a hierarchical tree is performed via a bottom-up approach, starting with leaf nodes and ending with a root node of the hierarchical tree.

In one embodiment, in order to decrypt a particular node, one has to obtain an encryption key from its parent node, which is encrypted by a parent key of the parent node, and so on. Therefore, in order to decrypt an entire tree representing a file, a directory of one or more files, or an entire file system, one has to obtain an encryption key of the root node of the tree. Thus, the decryption process of a hierarchical tree is performed via a top-down approach, starting with a root node and ending with a leaf node of the hierarchical tree.

In a snapshot-based backup and migration system, content of a root node of a hierarchical tree representing a snapshot of content of a storage system at a point in time is different from one snapshot to another. As a result, an encryption key (also referred to as a root key) of a root node may be different. Therefore, by having a different encryption key or modifying an encryption key of the root key or any of the intermediate nodes, the key rotation and crypto shredding in effect have been accomplished for any of the child nodes with respect to the node of which the associated encryption key has been modified.

Figure 1:
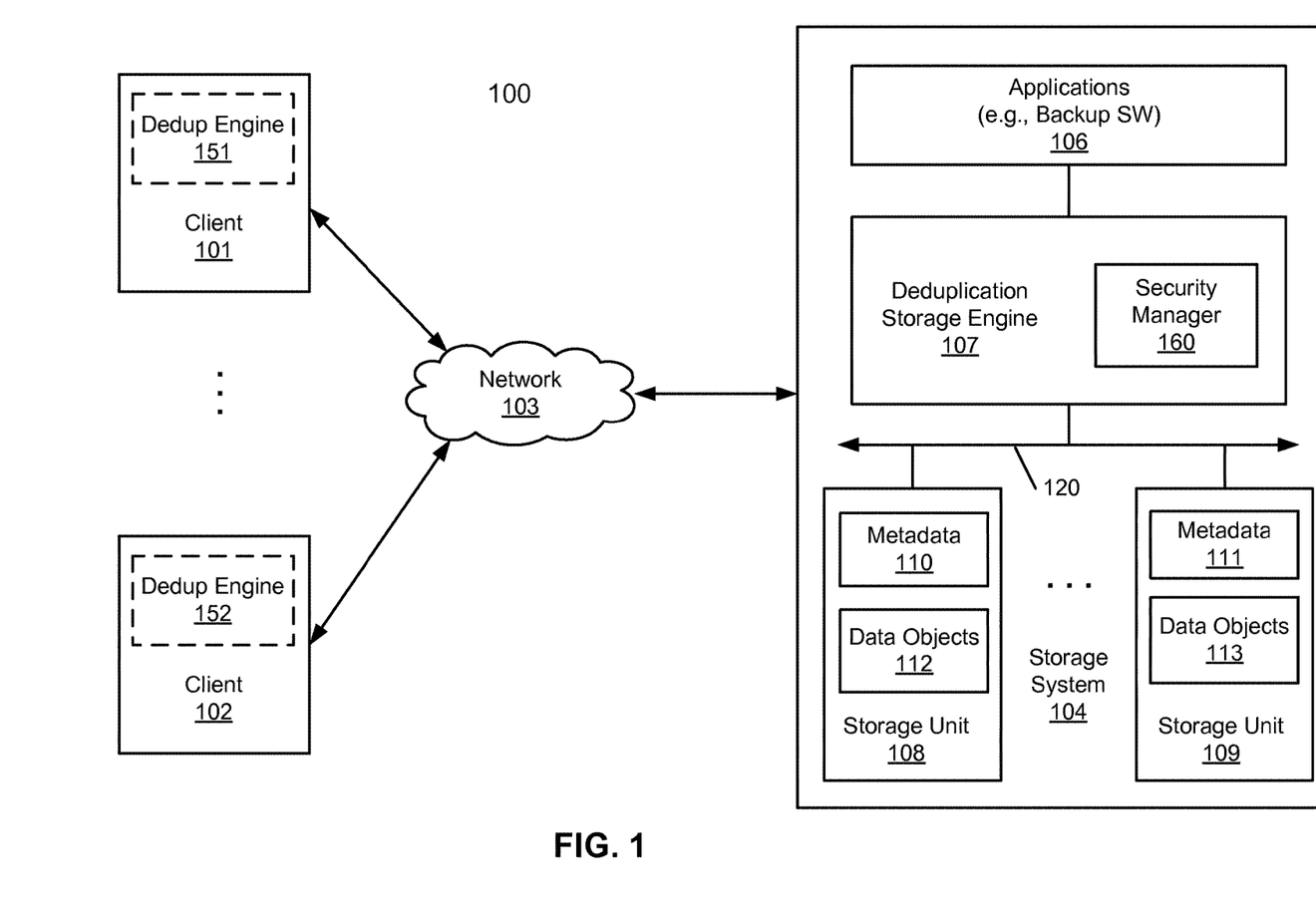
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Alternatively, any of clients 101-102 may be a primary storage system that provides storage to other local clients, which may periodically back up the content stored therein to a backup storage system, such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include any type of server or cluster of servers. For example, storage system 104 may be a storage server used for any of various different purposes, such as to provide multiple users with access to shared data and/or to back up data (e.g., mission critical data). In one embodiment, storage system 104 includes, but is not limited to, backup engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

In response to a data file to be stored in storage units 108-109, deduplication storage engine 107 is configured to segment the data file into multiple chunks (also referred to as segments) according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, any of clients 101-102 may further include a deduplication engine 151-152 having at least a portion of functionalities of deduplication engine 107. Deduplication engines 151-152 are configured to perform local deduplication operations, respectively. For example, prior to transmit data to storage system 104, each of the deduplication engines 151-152 may deduplicate the data into deduplicated segments and determine whether a particular deduplicated segment has been stored in storage system 104. A deduplicated segment is transmitted to storage system 104 only it has not been stored in storage system 104.

For example, when client 101 is about to transmit a data stream (e.g., a file or a directory of one or more files) to storage system 104, deduplication engine 151 is configured to deduplicate the data stream into deduplicated segments. For each of the deduplicated segments, client 101 transmits a fingerprint of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic and the processing resources required can be greatly reduced.

A storage system hierarchy of storage system 104 can be considered as a tree structure where data blocks get pointed to by the metadata blocks which themselves are pointed to by one or more parent levels of additional metadata block in a tree structure. Eventually a file inode points the root of the entire block-map tree. File inodes in turn reside in a directory data block that itself gets pointed to by the directory metadata blocks and this entire hierarchy can roll up all the way up to the super-block/prime-segment/root of the file system tree. In the hierarchical file system tree of deduplicated storage system 104, leaf nodes represent content of deduplicated data chunks or segments stored in the deduplicated storage system 104. An intermediate node represents metadata describing one or more child nodes as either lower level intermediate nodes and/or the leaf nodes. A root node of the hierarchical tree represents a content handle of a file, a directory of one or more files, and/or the entire file system.

In one embodiment, a security manager 160 is incorporated with or communicatively coupled to deduplication engine 107 to maintain the security of the data stored in storage system 104. As described above, a storage system hierarchy can be considered as a tree structure where data blocks get pointed to by the metadata blocks which themselves are pointed to by one or more parent levels of additional metadata block in a tree structure. Eventually a file inode points the root of the entire block-map tree. File inodes in turn reside in a directory data block that itself gets pointed to by the directory metadata blocks and this entire hierarchy can roll up all the way up to the super-block/prime-segment/root of the file system tree. In the hierarchical file system tree of a deduplicated storage system, leaf nodes represent content of deduplicated data chunks or segments stored in the deduplicated storage system. An intermediate node represents metadata describing one or more child nodes as either lower level intermediate nodes and/or the leaf nodes. A root node of the hierarchical tree represents a content handle of a file, a directory of one or more files, and/or the entire file system.

In one embodiment, each of the nodes in the hierarchical tree is encrypted by security manager 160 using an encryption key that is generated based on content of the corresponding node (e.g., hashing of the content of the corresponding node). Thus, each of the nodes in a hierarchical tree is encrypted using a different key. The encryption key of a particular node (e.g., child node) is stored together with content of its parent node. The encryption key of the child node and content of the parent node are then encrypted by a parent key, where the parent key is generated by security manager 160 based on content of the parent node (e.g., hashing of the content of the parent node), and so on. In this embodiment, the encryption process of a hierarchical tree is performed via a bottom-up approach, starting with leaf nodes and ending with a root node of the hierarchical tree.

In one embodiment, in order to decrypt a particular node, security manager 160 has to obtain an encryption key from its parent node, which is encrypted by a parent key of the parent node, and so on. Therefore, in order to decrypt an entire tree representing a file, a directory of one or more files, or an entire file system, one has to obtain an encryption key of the root node of the tree. Thus, the decryption process of a hierarchical tree is performed via a top-down approach, starting with a root node and ending with a leaf node of the hierarchical tree.

In a snapshot-based backup and migration system, content of a root node of a hierarchical tree representing a snapshot of content of a storage system (e.g., clients 101-102) at a point in time is different from one snapshot to another. As a result, an encryption key (also referred to as a root key) of a root node may be different. Therefore, by having a different encryption key or modifying an encryption key of the root key or any of the intermediate nodes, the key rotation and crypto shredding in effect have been accomplished for any of the child nodes with respect to the node of which the associated encryption key has been modified.

Figure 2:
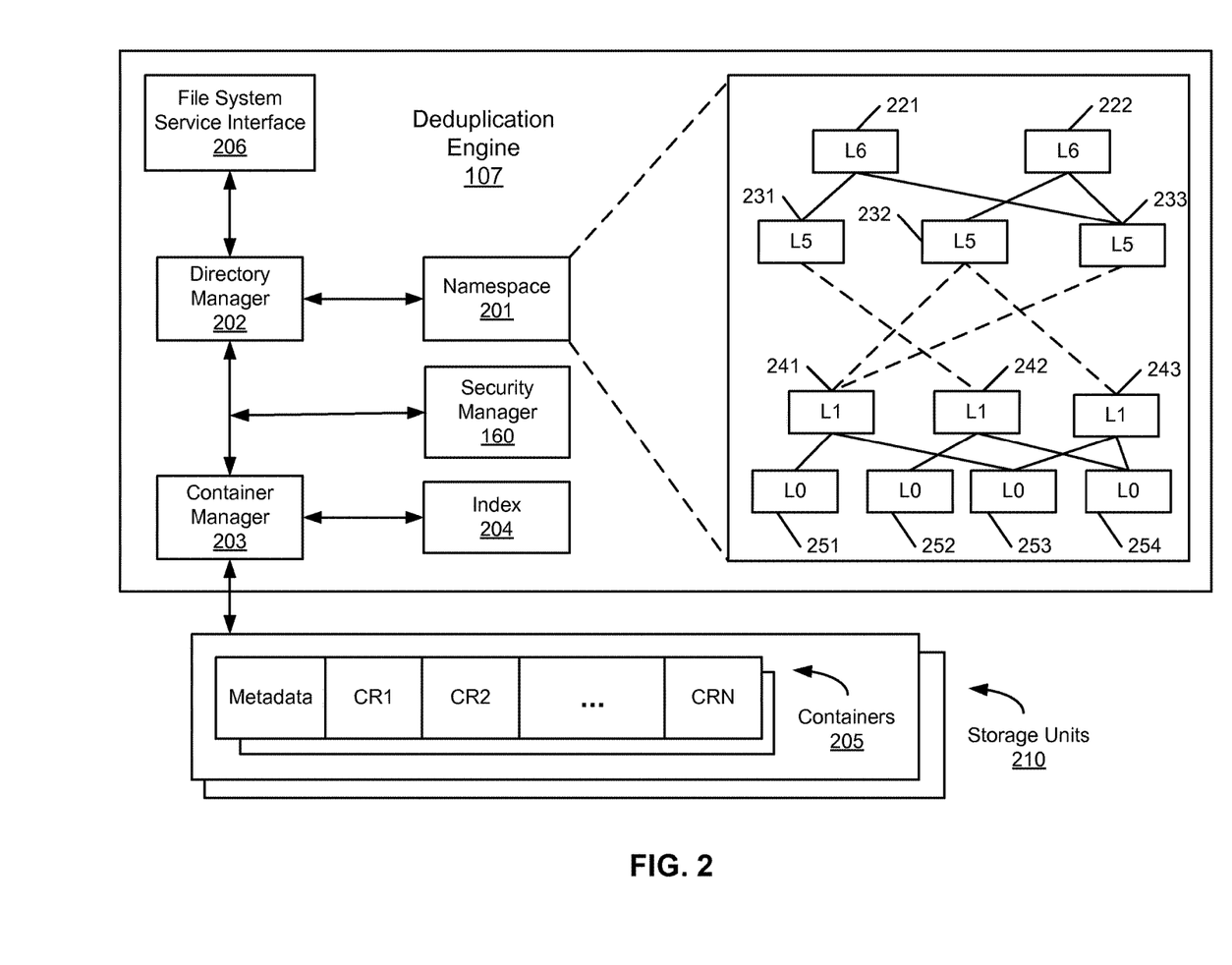
FIG. 2 is a block diagram illustrating a storage system according to one embodiment of the invention.

FIG. 2 is a block diagram illustrating a storage system according to one embodiment of the invention. System 200 may be implemented as part of storage system 104 of FIG. 1. Referring to FIG. 2, in one embodiment, security manager 160 traverses namespace 201 via directory manager 202, where directory manager 202 is configured to manage files stored in a file system of the storage system in a hierarchical manner. In a deduplicated file system, a file may be represented in a file tree having one or more levels of segments in a multi-level hierarchy. In this example, there are seven levels L0 to L6, where L6 is the root level, also referred to as a top parent level representing one or more content handles. More or fewer levels may be applied herein. Each upper level contains one or more references to one or more lower level segments. In one embodiment, an upper level segment contains a fingerprint (e.g., metadata) of fingerprints of its child level segments. Only the lowest level segments are the actual data segments containing the actual deduplicated segments. Thus, L1 to L6 are segments only contain metadata of their respective child segments(s), referred to herein as LP segments.

In one embodiment, when security manager 160 traverses namespace 201 via directory manager 202, it obtains and decrypts the fingerprints of the root level segments, in this example, L6 segments, as part of content handles from namespace 201. Based on the fingerprints of the current level segments, container manager 203, which may be part of a content store manager, can identify which of the containers 205 in which the segments are stored based on indexing information from index 204. Index 204 may be maintained in the system memory (e.g., volatile memory) and/or in a storage device (e.g., non-volatile memory). Index 204 includes information mapping a fingerprint to a storage location that stores a segment represented by the fingerprint. In one embodiment, index 204 may be a fingerprint-to-container identifier (FP/CID) index that maps a particular fingerprint to a container that contains the corresponding segment or a compression region (CR) having the segment stored therein. For further security, index 204 may contain a fingerprint of the actual fingerprint instead of the plain fingerprint to avoid compromising the fingerprint based key.

The metadata (e.g., fingerprints) and the data section of the current level segments can be obtained from the identified container. A container may contain metadata or fingerprints of all segments stored therein, where segments are compressed into a compression region. A segment can be obtained by retrieving the entire container or the corresponding compression region from the storage device or disk. Based on the metadata or the data section of a current level segment, its child segment or segments can be identified, and so on. Throughout this application, for the purpose of illustration, a container contains one or more compression regions and each compression region contains one or more segments therein. However, the techniques may also be applied to other storage layouts.

Referring back to FIG. 2, in one embodiment, there are two components responsible to manage the files in the system. The first one is directory manager 202, which is a hierarchical mapping from the path to the inode representing a file. The second one is a content store (not shown), which manages the content of the file. Each file has a content handle (CH) that is stored in the inode that is created by content store every time the file content changes. Each CH represents a file that is abstracted as a file tree (e.g., a Merkle tree or Mtree) of segments. A file tree is also referred to a fingerprint tree since it contains mostly fingerprints of the associated deduplicated segments. In this example, a file tree can have up to 7 levels: L0, L6. The L0 segments represent user data (e.g., actual data) and are the leaves of the tree. The L6 is the root of the segment tree. Segments from L1 to L6 are referred to as metadata segments or LP segments. They represent the metadata of the file. An L1 segment is an array of L0 references. Similarly an L2 is an array of L1 references and so on. A segment is considered live if it can be referenced by any live content in the file system.

The file system packs the segments into containers 205 which are written to a disk in a log-structured manner. The log-structured container set has a log tail and a log head. New containers are always appended at the head of the log. Each container is structured into sections. The first section is the metadata section and the following sections are compression regions. A compression region is a set of compressed segments. In the metadata section all the references or fingerprints that identify the segments in the container. The metadata further includes information identifying a content type, which describes the content of the container. For instance, it describes which compression algorithm has been used, which type of segments the container has (L0, . . . , L6), etc. Container manager 203 is responsible to maintain the log-structured container set and provide a mapping from container identifiers (CID) to block offset on disk. This mapping may be maintained in memory. It also contains additional information, e.g., the content type of each container.

In the example as shown in FIG. 2, segment 221 includes a fingerprint of fingerprints of segments 231 and 233, and segment 222 includes a representation (e.g., a fingerprint) of fingerprints of segments 232-233, and so on. Some of the segments, such as segment 233, are referenced shared by multiple parent level segments (e.g., segments 221-222). Thus, segments 221-222, 231-233, and 241-243 only contain data representing the metadata of their respective child segments. Only segments 251-254 contain the actual user data. Note that some or all of the components as shown in FIG. 2 may be implemented in software, hardware, or a combination thereof.

Figure 3:
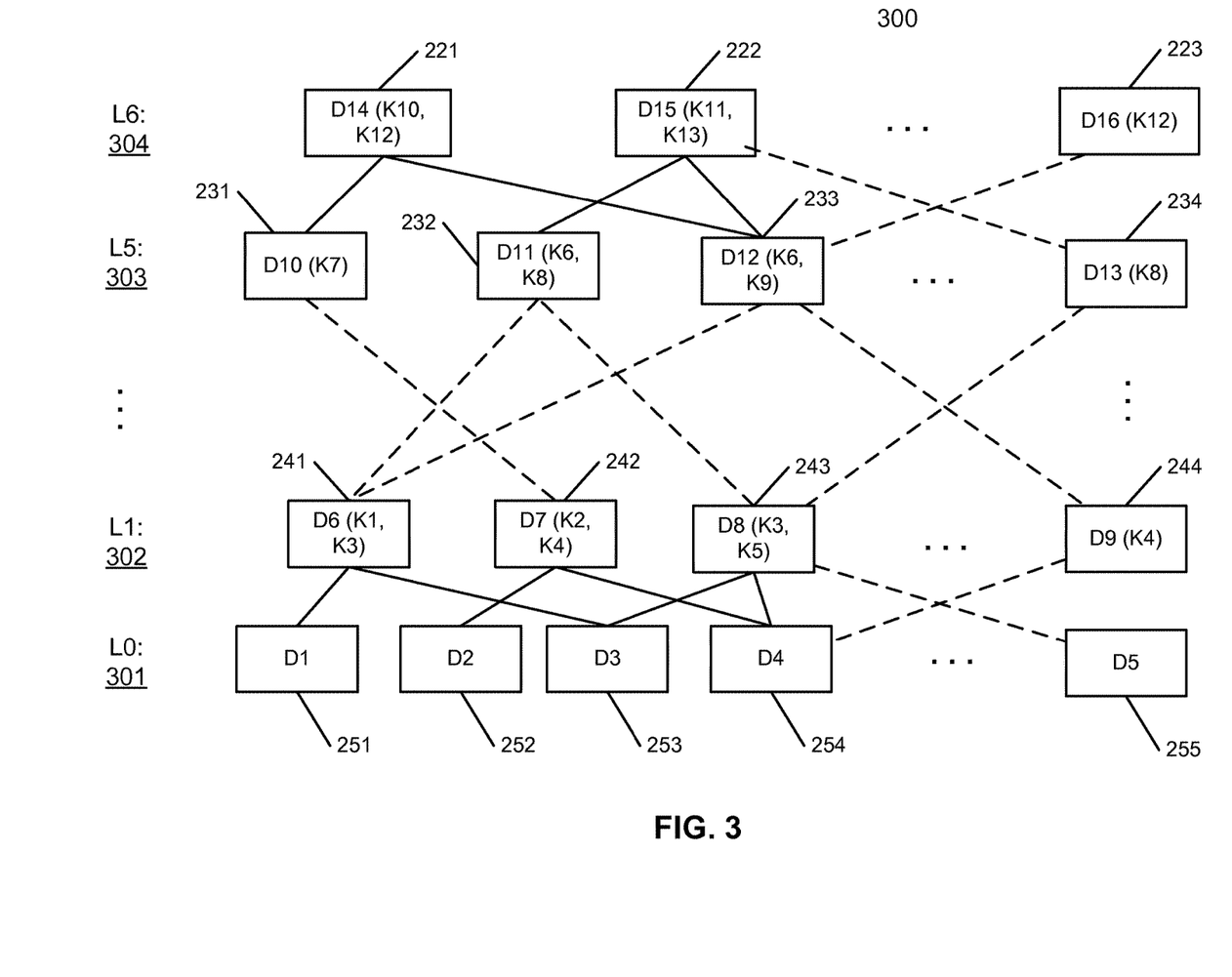
FIG. 3 is a block diagram illustrating a structure of a namespace of a storage system according to one embodiment of the invention.

FIG. 3 is a block diagram illustrating a structure of a namespace of a storage system according to one embodiment of the invention. For example, namespace 300 may represent namespace 201 of FIG. 2. Referring to FIG. 3, in one embodiment, each of the nodes 221-255 in the hierarchical tree is encrypted by security manager 160 using an encryption key that is generated based on content of the corresponding node (e.g., hashing of the content of the corresponding node). Thus, each of the nodes in a hierarchical tree is encrypted using a different key. The encryption key of a particular node (e.g., child node 253) is stored together with content of its parent node. The encryption key of the child node and content of the parent node are then encrypted by a parent key of the parent node, where the parent key is generated by security manager 160 based on content of the parent node (e.g., hashing of the content of the parent node), and so on.

In this embodiment, the encryption process of a hierarchical tree is performed via a bottom-up approach, starting with leaf nodes 251-255 and ending with root nodes 221-223 of the hierarchical tree 300. In one embodiment, an encryption key to encrypt a particular node is generated based on a fingerprint of the node. Similarly, in order to decrypt a particular node, security manager 160 has to obtain an encryption key from its parent node, which is encrypted by a parent key of the parent node, and so on. Therefore, in order to decrypt an entire tree representing a file, a directory of one or more files, or an entire file system, one has to obtain an encryption key of the root node of the tree. Thus, the decryption process of a hierarchical tree is performed via a top-down approach, starting with root nodes 221-223 and ending with leaf nodes 251-255 of the hierarchical tree 300.

In one embodiment, different encryption keys are applied to every unique leaf nodes in the tree hierarchy (e.g., nodes 251-255). To manage key explosion, convergent encryption techniques are utilized. Convergent encryption, also known as content hash keying, is a cryptosystem that produces identical cipher text from identical plaintext files. In this embodiment, the keys are computed dynamically from the content of the leaf nodes themselves using a secure hash algorithm. The key at the leaf nodes should be embedded in the content of the node that point to the leaf node (e.g., a parent node to the leaf node). The same encryption process is iteratively performed for the next level internal nodes in the file system tree. The individual internal nodes are encrypted with a key that is generated dynamically based on the content of this internal tree node itself using secure hash algorithm. Now, unless this first level intermediate node in the file system tree itself can be decrypted, one would never retrieve the key of the leaf data node that it points to.

Repeating the above process according to the tree structure and rolling encryption key in a similar fashion in upward direction, processing logic can get to the root of the file system. The root of the file system can be encrypted using a user supplied encryption key. Thus, unless the root of the file system itself can be decrypted, any part of the file system cannot be decrypted. This technique can also be utilized in presence of hard links, snapshots and deduplication. In such systems, any file system node can be pointed to by more than one node. Given the fact that the encryption key for any given internal/leaf node in the file system tree is based on the content of that specific node itself as convergent encryption technique is utilized, and the key for the child nodes are stored in the parent nodes and hence keys get rolled up, as the processing logic walks the file system tree from leaf nodes towards root to a given internal node.

Sharing of a given leaf/internal node in this tree continues to work well because all the parent nodes of a given node use the key stored internally corresponding to the child node, to decrypt the child node. This hierarchical encryption algorithm continues to work well even for storage systems that have a DAG structure as opposed to a tree structure. The hierarchical algorithm described herein does not need to roll all the way up to the root of the file system. It can be rolled only up to some intermediate nodes in the tree, e.g. a specific file or a specific directory or a specific snapshot. And only that intermediate node can be encrypted using the user-supplied key. Please note, if any internal node in the file system tree is encrypted with user supplied key then it could prevent ability of that node to get shared across multiple parent nodes.

Key rotation for any part of the storage system encrypted with the user supplied key would involve only decrypting that specific node of the storage system and re-encrypting it with the new key. This makes key rotation independent of the size of the metadata or the data in the storage system. When key rotation is required for the entire storage system, key rotation is performed only on the root node of the storage system tree. Since key rotation gets applied only to the root of the storage system, it does not impact the system's ability to respond to multiple storage system key rotations in quick succession. Such a hierarchical encryption scheme offers additional benefits over convergent encryption in deduplication or snapshot based storage systems. This is because it allows for longer runs of individually encrypted data blocks to be merged at a higher intermediate tree node level if these runs are identical.

The above techniques can also be applied to instant data sanitization. To achieve this, system generates an absolutely random key. This random key is protected by lock-box type approach with the user-supplied key. This random key is used to encrypt the root of the file system tree. In order to do data sanitization, one just needs to generate a new random key and overwrite the older random key with some junk value as mandated by data sanitization specification (e.g. overwriting it with different patterns multiple times). Such a scheme has multiple advantages In hierarchical encryption, keys applied to internal nodes of the file system tree are not static by nature as the file system gets modified. Specifically metadata node keys automatically change more often than the nodes they refer to. Metadata nodes that are closer to the root of the tree tend to change more often than the nodes toward the leaf. A random system generated key to encrypt the root of the file system provides a single point of shredding entity to achieve instant data sanitization. This can all be done without renewing the user-supplied key and bothering the user with sanitization process. Blocks/segments that are shared between multiple metadata nodes automatically die the moment last reference to these blocks get shredded.

Referring back to FIG. 3, for example, the keys K1 and K3 for encrypting leaf nodes D1 and D3, in this example, each representing a deduplicated segment, are generated by security manager 160 based on content of the leaf nodes D1 and D3. In one embodiment, K1 and K3 represent fingerprints of nodes D1 and D3, respectively. Keys K1 and K3 (which may also be part of fingerprints of nodes D1 and D3) are then stored as part of a parent node, node D6, of nodes D1 and D3. Content of node D6, in this example, keys K1 and K3, are encrypted by a key associated with node D6, K6. Similarly, K6 is generated based on content of node D6 (e.g., K1 and K3) and K6 is stored as part of its parent node, node 232 and node 233, and so on. The above example process is iteratively performed in a bottom-up manner, from leaf nodes 251-255, until it reaches root nodes 221-223. Keys for encrypting root nodes 221-223 may be user provided keys or securely stored keys (e.g., those not stored with any of the nodes 221-255 of tree 300).

Similarly, when retrieving data represented by tree 300, security manager 160 is configured to decrypt each of the nodes 221-255 using a top-down approach, starting root nodes 221-223 and ending with leaf nodes 251-255. For example, for root node 221 (D14), security manager 160 obtains its decryption key, for example, from a user, and decrypts node D14 to reveal keys K10 and K12. Security manager 160 then looks up (or invoke another component, such as directory manager 202 and/or container manager 203 of FIG. 2 of a deduplication engine to look up) in an index data structure (e.g., index 204 of FIG. 2) to determine storage locations of nodes 231 and 233 based on keys K10 and K12 (which are also the fingerprints of nodes D10 and D12). Security manager 160 then decrypts nodes D10 and D12 using keys K10 and K12 to reveal the keys for their respective child nodes, and so on, until it reaches leaf nodes 251-255. Note that for the illustration purposes, only 7 levels (e.g., L0 to L6 as indicated levels 301 to 304) are shown; however, more or fewer levels may also be applied.

Figure 4:
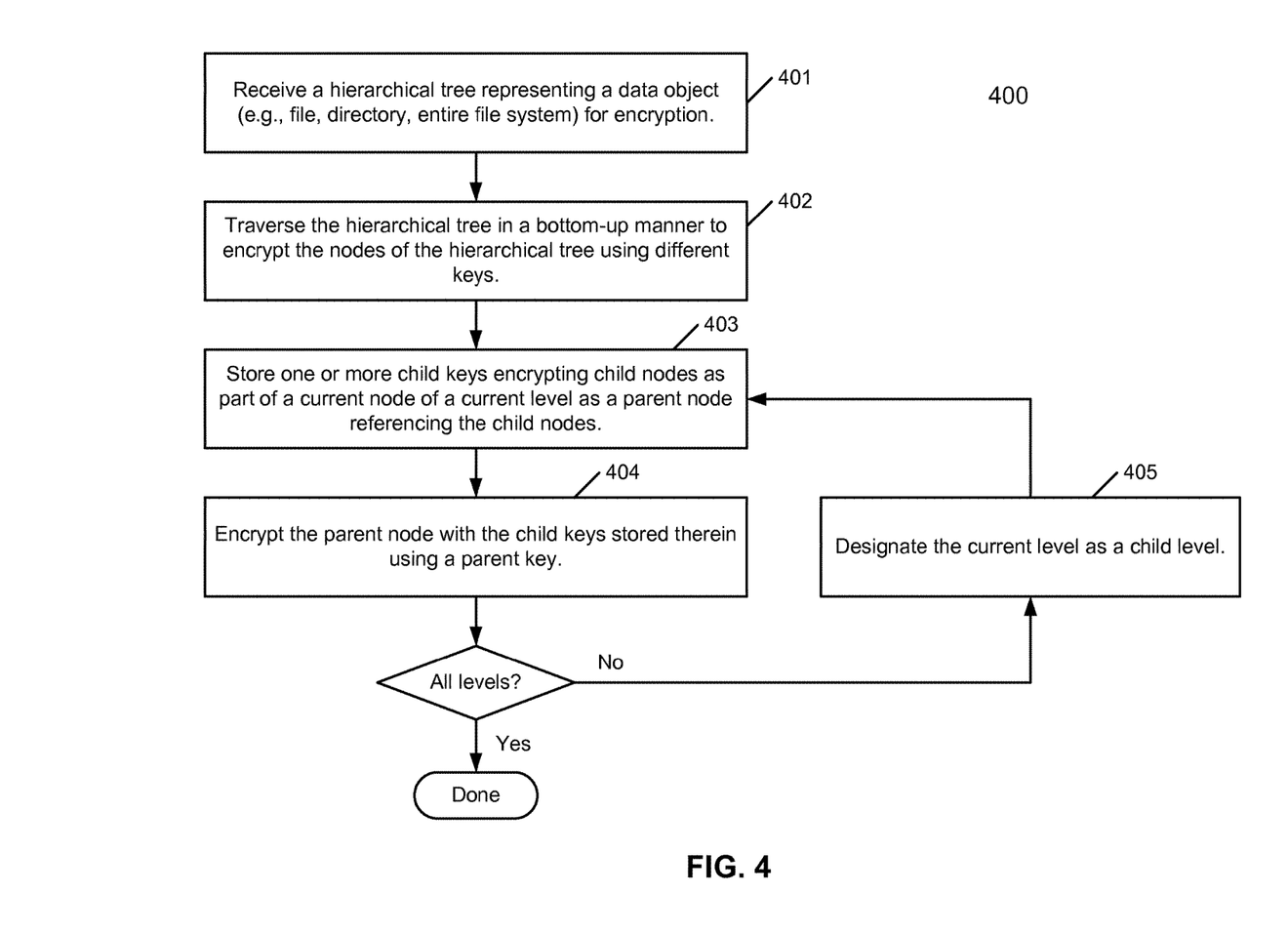
FIG. 4 is a flow diagram illustrating a method for encrypting data of a storage system according to one embodiment of the invention.

FIG. 4 is a flow diagram illustrating a method for encrypting data of a storage system according to one embodiment of the invention. Method 400 may be performed by processing logic which may include software, hardware, or a combination thereof. For example, method 400 may be performed by security manager 160 of deduplication engine 107 of FIG. 1. Referring to FIG. 4, at block 401, processing logic receives a hierarchical tree representing a data object (e.g., file, directory, or file system) for encryption. At block 402, processing logic reverses the hierarchical tree in a bottom-up manner to encrypt the nodes of the hierarchical tree using different keys. At block 403, for a given node processing logic stores one or more child keys encrypting the child nodes as part of the current given node of a current level (e.g., a parent node) referencing the child nodes. At block 404, processing logic encrypts the current node as a parent node with the child keys stored therein using a parent key (e.g., fingerprint of the current node). If there are more levels in the tree, at block 405, the current level is designated as a child level and the above operations are iteratively performed until it reaches all the root nodes.

Figure 5:
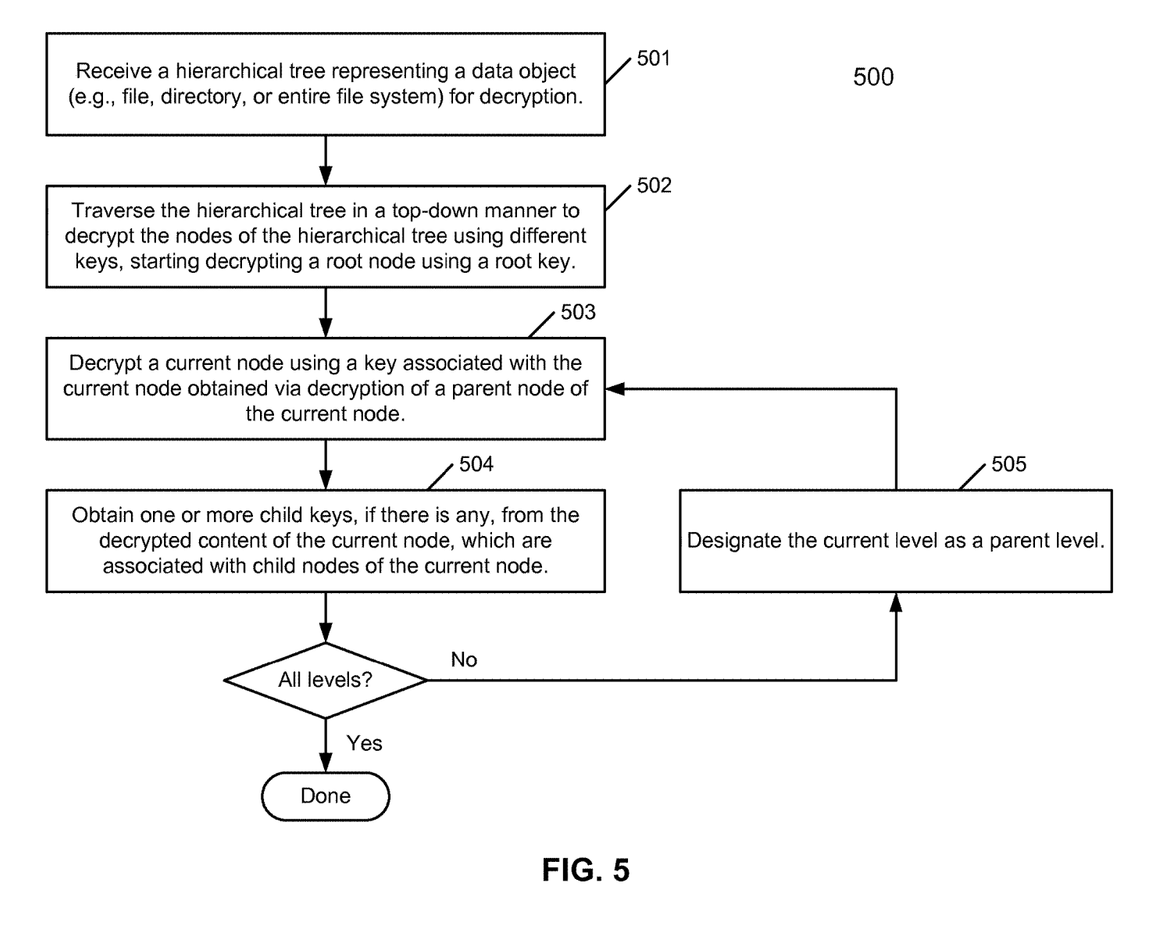
FIG. 5 is a flow diagram illustrating a method for decrypting data of a storage system according to one embodiment of the invention.

FIG. 5 is a flow diagram illustrating a method for decrypting data of a storage system according to one embodiment of the invention. Method 500 may be performed by processing logic which may include software, hardware, or a combination thereof. For example, method 500 may be performed by security manager 160 of deduplication engine 107 of FIG. 1. Referring to FIG. 5, at block 501, processing logic receives a hierarchical tree representing a data object (e.g., file, directory, entire file system). At block 502, processing logic traverses the hierarchical tree to decrypt nodes of the hierarchical tree using different keys, in a top-down manner, starting decrypting a root node using a root key. At block 503, for a given current node, processing logic decrypts the current node using a key associated with the current node that is obtained via decryption of its parent node. At block 504, processing logic obtains one or more child keys from the decrypted current node, where the child keys are associated with one or more child nodes of the current node, respectively. If there are more levels, the current level is designated as a parent level at block 505, and the above operations are iteratively performed, until it reaches the leaf nodes.

Figure 6:
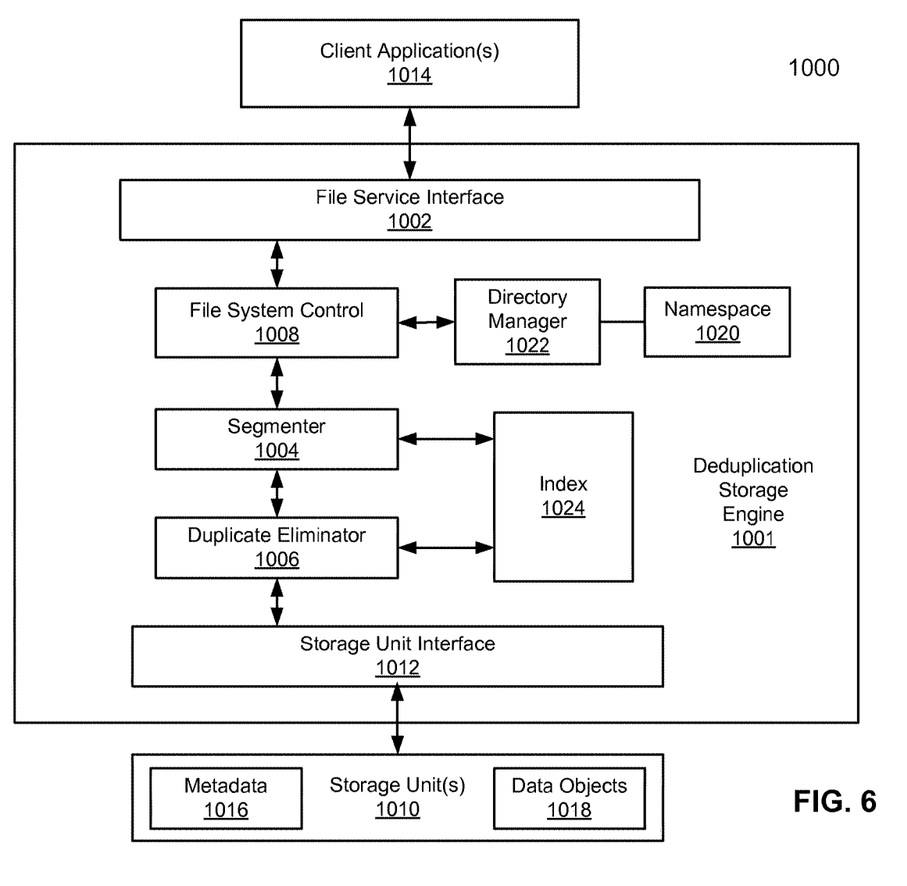
FIG. 6 is a block diagram illustrating a deduplicated storage system according to one embodiment of the invention.

FIG. 6 is a block diagram illustrating a deduplication storage system according to one embodiment of the invention. For example, deduplication storage system 1000 may be implemented as part of a deduplication storage system as described above, such as, for example, the deduplication storage system as a client and/or a server as shown in FIG. 1. In one embodiment, storage system 1000 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 1000 may have a distributed architecture, or all of its components may be integrated into a single unit. Storage system 1000 may be implemented as part of an archive and/or backup system such as a deduplicating storage system available from EMC® Corporation of Hopkinton, Mass.

In one embodiment, storage system 1000 includes a deduplication engine 1001 interfacing one or more clients 1014 with one or more storage units 1010 storing metadata 1016 and data objects 1018. Clients 1014 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 1010 may be implemented locally (e.g., single node operating environment) or remotely (e.g., multi-node operating environment) via an interconnect, which may be a bus and/or a network (e.g., a storage network). In one embodiment, one of storage units 1010 operates as an active storage to receive and store external or fresh user data from a client (e.g., an end-user client or a primary storage system associated with one or more end-user clients), while the another one of storage units 1010 operates as a target storage unit to periodically archive data from the active storage unit according to an archiving policy or scheme. Storage units 1010 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1010 may also be combinations of such devices. In the case of disk storage media, the storage units 1010 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 1016, may be stored in at least some of storage units 1010, such that files can be accessed independent of another storage unit. Metadata of each storage unit includes enough information to provide access to the files it contains. In one embodiment, metadata may include fingerprints contained within data objects 1018, where a data object may represent a data chunk, a compression region (CR) of one or more data chunks, or a container of one or more CRs. Fingerprints are mapped to a particular data object via metadata 1016, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 1016 may include a file name, a storage unit identifier (ID) identifying a storage unit in which the chunks associated with the file name are stored, reconstruction information for the file using the chunks, and any other appropriate metadata information. Metadata 1016 may further include a chunk ID, a chunk sketch, a hash of a chunk, an encrypted hash of a chunk, random data, or any other appropriate metadata. In some embodiments, metadata associated with a chunk is used to identify identical and/or similar data segments. The stored metadata enables a faster identification of identical and/or similar data chunks as an ID and/or sketch (e.g., a set of values characterizing the chunk) do not need to be recomputed for the evaluation of a given incoming data segment.

In one embodiment, a chunk ID includes one or more deterministic functions of a data chunk (also referred to as a data segment), one or more hash functions of a data chunk, random data, or any other appropriate data chunk ID. In various embodiments, a data chunk sketch includes one or more deterministic functions of a data chunk, one or more hash functions of a data chunk, one or more functions that return the same or similar value for the same or similar data chunks (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a chunk. For example, a sketch may be generated by applying one or more functions (e.g., hash functions) on a chunk and a subset of the results of the functions performed on the chunk (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 1001 includes file service interface 1002, segmenter 1004 (also referred to as a chunking module or unit), duplicate eliminator 1006, file system control 1008, and storage unit interface 1012. Deduplication storage engine 1001 receives a file or files (or data item(s)) via file service interface 1002, which may be part of a file system namespace 1020 of a file system associated with the deduplication storage engine 1001. The file system namespace 1020 refers to the way files are identified and organized in the system. An example is to organize the files hierarchically into directories or folders, which may be managed by directory manager 1022. File service interface 1012 supports a variety of protocols, including a network file system (NFS), a common Internet file system (CIFS), and a virtual tape library interface (VTL), etc.

The file(s) is/are processed by segmenter 1004 and file system control 1008. Segmenter 1004, also referred to as a content store, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based, such as, for example, a hash function is applied to values of data within a sliding window through the data stream or block and when the hash function is equal to a value (or equal to one of several values) then a chunk boundary is identified. In various embodiments, chunk boundaries are identified using content based functions operating on a sliding window within a data stream or block that have a minimum or maximum or other value or any other appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, a chunk boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 1008, also referred to as a file system manager, processes information to indicate the chunk(s) association with a file. In some embodiments, a list of fingerprints is used to indicate chunk(s) associated with a file. File system control 1008 passes chunk association information (e.g., representative data such as a fingerprint) to index 1024. Index 1024 is used to locate stored chunks in storage units 1010 via storage unit interface 1012. Duplicate eliminator 1006, also referred to as a segment store, identifies whether a newly received chunk has already been stored in storage units 1010. In the event that a chunk has already been stored in storage unit(s), a reference to the previously stored chunk is stored, for example, in a chunk or segment tree associated with the file, instead of storing the newly received chunk. A chunk or segment tree of a file may include one or more nodes and each node represents or references one of the deduplicated chunks stored in storage units 1010 that make up the file. Chunks are then packed by a container manager (which may be implemented as part of storage unit interface 1012) into one or more storage containers stored in storage units 1010. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to deduplicated segments). A container may further contain the metadata such as fingerprints, sketches, type of the data chunks, etc. that are associated with the data chunks stored therein.

When a file is to be retrieved, file service interface 1002 is configured to communicate with file system control 1008 to identify appropriate chunks stored in storage units 1010 via storage unit interface 1012. Storage unit interface 1012 may be implemented as part of a container manager. File system control 1008 communicates (e.g., via segmenter 1004) with index 1024 to locate appropriate chunks stored in storage units via storage unit interface 1012. Appropriate chunks are retrieved from the associated containers via the container manager and are used to construct the requested file. The file is provided via interface 1002 in response to the request. In one embodiment, file system control 1008 utilizes a tree (e.g., a chunk tree obtained from namespace 1020) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1001 may be implemented in software (e.g., executable code executed in a memory by a processor), hardware (e.g., processor(s)), or a combination thereof. For example, deduplication engine 1001 may be implemented in a form of executable instructions that can be stored in a machine-readable storage medium, where the instructions can be executed in a memory by a processor.

In one embodiment, storage system 1000 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for accessing data objects of a storage system, the method comprising:
   in response to a request received from a client for retrieving a data object stored in a storage system, obtaining a root key from the request, the data object being represented by metadata in a hierarchical structure having a plurality of levels, each level having a plurality of nodes and each node being one of a root node, a leaf node and an intermediate node, wherein each intermediate node or leaf node is encrypted using an encryption key, wherein the encryption key is stored together with content of a parent node, and is further encrypted together with the content of the parent node by a parent key of the parent node:
   traversing the hierarchical structure of metadata associated with the data object in a top-down approach to decrypt each of a plurality of nodes in the hierarchical structure using a key provided from its parent node, starting from the root node to the leaf nodes, including decrypting the root node using the root key; and
   transmitting decrypted data associated with the plurality of nodes to the client.

2. The method of claim 1, wherein each leaf node of the hierarchical structure represents a deduplicated segment associated with the data object and each parent node stores metadata of its one or more child nodes.

3. The method of claim 1, further comprising:
   for a given first node as a parent node to one or more second nodes as child nodes, decrypting the first node using a first key associated with the first node to reveal one or more second keys corresponding to the one or more second nodes, respectively; and
   decrypting, using the second keys, the one or more second nodes, to reveal content of the one or more second nodes.

4. The method of claim 1, wherein the one or more second keys are derived from fingerprints of the one or more second nodes, respectively.

5. The method of claim 1, wherein the root key is provided by a user who initiated encryption of the data object, and wherein the root key is not stored within the storage system to prevent from being compromised.

6. The method of claim 1, wherein a child key encrypting content of a child node is stored in a parent node that references the child node.

7. The method of claim 6, wherein the child key is encrypted together with content of the parent node by a parent key associated with the parent node.

8. A non-transitory machine-readable medium having instructions stored therein, which when executed by a processor, cause the processor to perform operations of accessing data objects of a storage system, the operations comprising:
   in response to a request received from a client for retrieving a data object stored in a storage system, obtaining a root key from the request, the data object being represented by metadata in a hierarchical structure having a plurality of levels, each level having a plurality of nodes and each node being one of a root node, a leaf node and an intermediate node, wherein each intermediate node or leaf node is encrypted using an encryption key, wherein the encryption key is stored together with content of a parent node, and is further encrypted together with the content of the parent node by a parent key of the parent node;
   traversing the hierarchical structure of metadata associated with the data object in a top-down approach to decrypt each of a plurality of nodes in the hierarchical structure using a key provided from its parent node, starting from the root node to the leaf nodes, including decrypting the root node using the root key; and transmitting decrypted data associated with the plurality of nodes to the client.

9. The machine-readable medium of claim 8, wherein each leaf node of the hierarchical structure represents a deduplicated segment associated with the data object and each parent node stores metadata of its one or more child nodes.

10. The machine-readable medium of claim 8, wherein the operations further comprise:

for a given first node as a parent node to one or more second nodes as child nodes, decrypting the first node using a first key associated with the first node to reveal one or more second keys corresponding to the one or more second nodes, respectively; and decrypting, using the second keys, the one or more second nodes, to reveal content of the one or more second nodes.

11. The machine-readable medium of claim 8, wherein the one or more second keys are derived from fingerprints of the one or more second nodes, respectively.

12. The machine-readable medium of claim 8, wherein the root key is provided by a user who initiated encryption of the data object, and wherein the root key is not stored within the storage system to prevent from being compromised.

13. The machine-readable medium of claim 8, wherein a child key encrypting content of a child node is stored in a parent node that references the child node.

14. The machine-readable medium of claim 13, wherein the child key is encrypted together with content of the parent node by a parent key associated with the parent node.

15. A storage system, comprising:

a processor; and a memory coupled to the processor for storing instructions, which when executed from the memory, cause the processor to perform operations of accessing data objects, the operations including in response to a request received from a client for retrieving a data object stored in the storage system, obtaining a root key from the request, the data object being represented by metadata in a hierarchical structure having a plurality of levels, each level having a plurality of nodes and each node being one of a root node, a leaf node and an intermediate node, wherein each intermediate node or leaf node is encrypted using an encryption key, wherein the encryption key is stored together with content of a parent node, and is further encrypted together with the content of the parent node by a parent key of the parent node, traversing the hierarchical structure of metadata associated with the data object in a top-down approach to decrypt each of a plurality of nodes in the hierarchical structure using a key provided from its parent node, starting from the root node to the leaf nodes, including decrypting the root node using the root key, and transmitting decrypted data associated with the plurality of nodes to the client.

16. The system of claim 15, wherein each leaf node of the hierarchical structure represents a deduplicated segment associated with the data object and each parent node stores metadata of its one or more child nodes.

17. The system of claim 15, wherein the operations further comprise:

for a given first node as a parent node to one or more second nodes as child nodes, decrypting the first node using a first key associated with the first node to reveal one or more second keys corresponding to the one or more second nodes, respectively; and decrypting, using the second keys, the one or more second nodes, to reveal content of the one or more second nodes.

18. The system of claim 15, wherein the one or more second keys are derived from fingerprints of the one or more second nodes, respectively.

19. The system of claim 15, wherein the root key is provided by a user who initiated encryption of the data object, and wherein the root key is not stored within the storage system to prevent from being compromised.

20. The system of claim 15, wherein a child key encrypting content of a child node is stored in a parent node that references the child node.

21. The system of claim 20, wherein the child key is encrypted together with content of the parent node by a parent key associated with the parent node.

* * * * *